United States Patent [19]

Bindra

[11] Patent Number: 6,001,167
[45] Date of Patent: *Dec. 14, 1999

[54] PIGMENT COMPOSITIONS

[75] Inventor: Amrit Bindra, Brecksville, Ohio

[73] Assignee: Engelhard Corporation, Iselin, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/689,177

[22] Filed: Aug. 6, 1996

[51] Int. Cl.$^6$ .................................................. C09B 63/00
[52] U.S. Cl. .......................... 106/402; 106/31.6; 523/200
[58] Field of Search ................................. 106/402, 31.6; 523/200

[56] References Cited

U.S. PATENT DOCUMENTS

| | | | |
|---|---|---|---|
| 2,189,806 | 2/1940 | Lang et al. | 534/874 |
| 4,084,983 | 4/1978 | Bernhard et al. | 106/402 |
| 4,167,422 | 9/1979 | Bellanca et al. | 106/402 |
| 4,444,592 | 4/1984 | Ludwig | 106/31.75 |
| 4,486,237 | 12/1984 | Paffoni et al. | 106/445 |
| 4,628,082 | 12/1986 | Lorenz et al. | 106/31.77 |
| 4,664,715 | 5/1987 | Jesse | 106/402 |
| 4,968,351 | 11/1990 | Ahmed et al. | 106/402 |
| 5,084,106 | 1/1992 | Kobayashi et al. | 106/402 |
| 5,102,466 | 4/1992 | Mordente et al. | 106/402 |

FOREIGN PATENT DOCUMENTS

| | | |
|---|---|---|
| 0 052 069 | 5/1982 | European Pat. Off. . |
| 339 606 | 6/1904 | France . |
| 366 110 | 9/1906 | France . |
| 2 299 387 | 8/1976 | France . |
| 2 564 099 | 11/1985 | France . |

OTHER PUBLICATIONS

Chemical Abstracts Registry File, Registry No. 82856–53–9, May 1982.
Chemical Abstracts Registry File, Registry No. 69644–66–2, with structure, Dec. 1979.
Japanese Patent Office Abstract of JP61–7367 with structure, Jan. 1986.
Chemical Abstract No. 98:13489, "Properties of Purified orange II azoreductase . . . azo dye . . . " Zimmermann et al., Dec. 1982.
Chemical Abstract No. 95:38494, "Investigation of rate–determining factors . . . azo dyes", Wuhrmann et al., Dec. 1980.
Chemical Abstract No. 92:95613, "Spectrophotometric studies of som Schaeffer acid azo dyes . . . ", Kalifa et al., Dec. 1979.
Chemical Abstract No. 90:123031, "Textile chemical investigations . . . azo dyes", Meyer et al., Dec. 1979.
Chemical Abstract No. 97:111286, "Red Pigments", EP 52069, Campbell, May 1982.
Colour Index International CD–ROM, 3rd Edition, 1995, C.I. Generic Name: Pigment Red 104 C.I. Constitution No. 77605 (No Date).
Colour Index Intern'l—C.I. Generic Name: C.I. Pigment Orange 16 (Bright Orange) C.I. Constitution No. 21160 (No Date).
Colour Index Intern'l—C.I. Generic Name: C.I. Pigment Orange 34 (Orange) C.I. Constitution No. 21115 (No Date).
Chemical Abstracts 105 (1986) Sep., No. 12, Columbus, OH, p. 101; 105:99341h—Red pigments for process links. Hotta, Seishi et al. Jan. 1986.
Registry Copyright 1995 ACS, 69644–66–2 Registry (No Date).

*Primary Examiner*—Mark L. Bell
*Assistant Examiner*—Scott L. Hertzog
*Attorney, Agent, or Firm*—Richard F. Keller

[57] ABSTRACT

Disclosed are compositions comprising one or more compounds characterized by the formula:

$$\left[ HOOC-\underset{(R)_n}{\bigcirc}-N=N-\underset{SO_3^{\ominus}}{\overset{OH}{\bigcirc}} \right]_2 M^{\oplus\oplus}$$

wherein each R is independently a hydrocarbyl, hydroxy, hydrocarbyloxy, carboxylic acid, carboxylic acid ester, carboxylic acid amide, sulfonic acid, sulfonic acid amide, imidazolone or nitro group; n is 0, 1 or 2; and M is at least one divalent metal. A process for preparing azo pigment compositions is also disclosed. Paint, ink and plastic compositions containing the foregoing pigments compositions are disclosed.

35 Claims, No Drawings

PIGMENT COMPOSITIONS

BACKGROUND OF THE INVENTION

1. Field of the Invention

This invention relates to novel azo orange pigments, processes for their preparation and to paint, plastic and ink compositions containing such pigments.

2. Description of Related Art

Commercially available orange pigments commonly used in plastics include such pigments as Colour Index (C.I.) Pigment Orange 16 and 34, and Pigment Red 104.

Pigment Orange 16 and 34 are diarylide based pigments. It was reported, however, in R. Az et al, *Dyes and Pigments*, 15, 1 (1991), that diarylides may degrade to potentially carcinogenic by-products (e.g., 3,3'-dichlorobenzidine) in plastics processed above 200° C., a temperature lower than those used in processing most plastics (e.g., 250–330° C).

Pigment Red 104 is a lead chromate-lead molybdate which of course is undesirable because of its heavy metal content.

Consequently, there is still a need for orange pigments that show improved performance in properties such as color strength, resistance to polar solvent, light fastness and/or heat stability.

SUMMARY OF THE INVENTION

This invention relates to orange pigments suitable for use as coloring agents, and processes for their preparation.

In one embodiment, this invention relates to a composition comprising one or more compounds characterized by the formula:

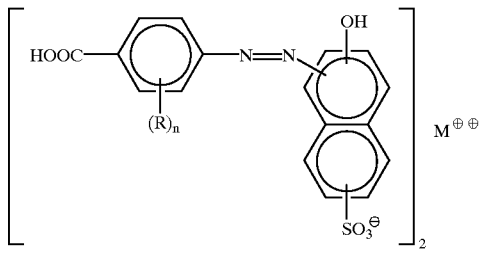

wherein each R is independently a hydrocarbyl, hydroxy, hydrocarbyloxy, carboxylic acid, carboxylic acid ester, carboxylic acid amide, sulfonic acid, sulfonic acid amide, imidazolone or nitro group; n is 0, 1 or 2; and M is at least one divalent metal.

In another embodiment, this invention relates to a process for preparing azo pigments which comprises 1) preparing an azo dye composition by a process comprising coupling (i) at least one diazonium component of one or more aromatic amines characterized by the formula:

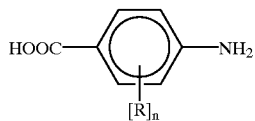

wherein each R is independently a hydrocarbyl, hydroxy, hydrocarbyloxy, carboxylic acid, carboxylic acid ester, carboxylic acid amide, sulfonic acid, sulfonic acid amide, imidazolone or nitro group; n is 0, 1 or 2; with (ii) at least one hydroxynaphthalenesulfonic acid coupling component;

2) metallizing at least a portion of said azo dye with one or more divalent metal salts to form a slurry of azo pigment; wherein the final pH of said slurry is less than about 6; and 3) recovering at least a portion of said pigment.

In still another embodiment, this invention relates to azo orange pigment compositions prepared by the foregoing process.

In one other embodiment, this invention relates to paint, plastic and ink compositions containing the azo pigment compositions of this invention.

DESCRIPTION OF THE PREFERRED EMBODIMENTS

As previously stated, this invention provides azo pigments and processes for their preparation. The azo pigments of the present invention are prepared by initially diazotizing one or more aromatic amines suitable for use in this invention and thereafter coupling the diazonium component with a coupling component suitable for use in this invention to form the desired dye.

Aromatic amines suitable for the purposes of the present invention are those characterized by the formula:

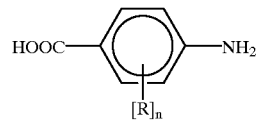

wherein each R is independently a hydrocarbyl, hydroxy, hydrocarbyloxy, carboxylic acid, carboxylic acid ester, carboxylic acid amide, sulfonic acid, sulfonic acid amide, imidazolone or nitro group; n is 0, 1 or 2.

The term "hydrocarbyl" as used in this specification and claims is intended to include hydrocarbon groups which may contain substituent groups such as ether, ester, nitro or halogen which do not materially affect the hydrocarbon character of the group.

The aromatic amines suitable for use in this invention have a para substituted carboxylic acid group and may contain 0, 1 or 2, preferably 0 or 1, R groups which are each independently a hydrocarbyl, hydroxy, hydrocarbyloxy, carboxylic acid ester, carboxylic acid amide, sulfonic acid ester, sulfonic acid amide, imidazolone, or nitro group. The hydrocarbyl groups may independently be alkyl, cycloalkyl, aryl, aralkyl or alkaryl groups. For example, if R is an unsubstituted aryl group, the aromatic amine is a biphenyl amine. When R is an alkyl group, the alkyl group will generally contain from one to four carbon atoms. As used herein, "lower alkyl" shall mean those alkyl groups containing from 1 up to 4 carbon atoms. When R is a hydrocarbyloxy group, the hydrocarbyl moiety may be any of the hydrocarbyl groups discussed above, although the hydrocarbyloxy group generally is an alkoxy group containing from 1 up to 4 carbon atoms ( i.e., lower alkloxy). Preferred R groups are methyl, ethyl, methoxy and ethoxy groups.

Examples of aromatic amines wherein n is 0 is 4-aminobenzoic acid, when n is 1 include 4-amino-3-methylbenzoic acid, and wherein it is understood that the imidazolone group is represented by the formula —NHCONH— which, when taken together with the aromatic ring (n=2), the nitrogen atoms are bonded to adjacent carbons to form a five member ring. The carboxylic acid substituted aromatic amines can be used per se or as their salts. Examples of preferred salts include the alkali metal salts such as the sodium and potassium salts.

Mixtures of two or more of any aromatic amines are within the scope of this invention.

The diazotization of the aromatic amines may be carried out in the manners known to those skilled in the art through the use of alkali metal nitrites or lower alkyl nitrites together with an adequately strong acid such as a mineral acid. Examples of useful mineral acid include hydrochloric acid and sulfuric acid. Nitrosyl sulfuric acid can also be utilized. The diazotization reaction can be conducted at a temperature in the range of from about −20° to +30° C., preferably from 0° to 15° C. Although not required, it may be advantageous in some of the diazotization reactions (and in the subsequent coupling reactions) to include a surface-active agent such as a non-ionic, anionic or cationic surface active agent and, optionally, appropriate organic solvents such as, for example, glacial acetic acid, lower alkanols, dioxane, formamide, dimethyl formamide, dimethyl sulfoxide, pyridine or N-methyl pyrrolidone.

The hydroxynaphthalenesulfonic acid couplers useful for the purposes of this invention are represented by the formula:

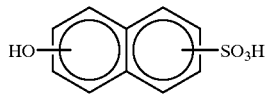

Examples of the hydroxynaphthalenesulfonic acid couplers useful for the purposes of this invention include 1-naphthol-4-sulfonic acid, 1-hydroxynaphthalene-4-sulfonic acid, 1-hydroxynaphthalene-5-sulfonic acid, 1-hydroxynaphthalene-8-sulfonic acid, 2-hydroxynaphthalene-6-sulfonic acid, etc.

Mixtures of two or more of any of the hydroxynaphthlenesulfonic acid couplers are within the scope of this invention.

The coupling reaction useful for the purposes of the present invention may be effected preferably by adding the diazonium components to coupling components, but the coupling components can be added to the diazonium components. Coupling is generally effected at a temperature of from about −20° to about 80° C., preferably from about 0° to about 60° C. and at a pH of from 4 to 12, preferably from about 5 to 11. As in a diazotization reaction, coupling may be carried out in the presence of an appropriate surface active agent or organic solvent, such as all of those identified above for the diazotization reaction.

In one embodiment, the coupling component is dissolved in a basic solution such as an aqueous alkali metal hydroxide solution and reprecipitated with a dilute acid such as acetic acid.

In another embodiment, generally, the diazonium component is coupled with a slight stoichiometric excess of the coupling component. That is, one equivalent of the diazonium component is coupled with slightly more than one equivalent of the coupling component.

In another embodiment of the present invention, the dispersibility of the pigments of the present invention can be improved by adding alkali-soluble resin-like products before, during, or after the coupling is completed or after the metallization discussed below. Various resin-like materials can be added for this purpose, and these include for example, rosin resins, polymeric rosins, resin soap, chemically modified rosin resins such as rosin-maleinate resins, alkyd resins, and other synthetic hydrocarbon resins with a higher acid number, or combination of these resins. The resins may be present in a product with free carboxyl groups that are capable of forming a salt, or may be partially or completely in the form of salts, for example, with alkali metal ions. It may also be advantageous to perform the coupling reaction in the presence of a finely divided insoluble material, for example, alkaline earth metal sulphates and carbonates, titanium dioxide or clay materials or very finely divided organic plastic materials.

The composition prepared by the above-described coupling reaction can be metallized by a divalent metal salt which forms the sulfonate salt. This is also known as laking and forms the azo pigment. The metal salt may be a salt of alkaline earth metals, manganese, nickel or zinc or mixtures of two or more of these metals. Alkaline earth metal salts are preferred. Alkaline earth metal salts such as $SrCl_2$ and $CaCl_2$ are particularly useful for this purpose. Metallization may be accomplished preferably by adding the metal salt to the dye after coupling of all the diazonium component present is complete or, by including the metal salt in the diazonium component whereby metallization occurs as the dye is formed. The metallization of the dye is completed by controlling the pH of the final slurry formed by metallizing the dye so that the slurry is below about 6, preferably below about 5.5. While not being bound by theory, it is believed that controlling the pH in this manner provides for the preferential metallization of the sulfonic acid group resulting in a substantial yield of the half sulfonic acid salt.

In most applications, it is desirable, in order to achieve the full brightness and tinctorial strength, to heat the azo pigment. For example, the product of the metallization may be heated to reflux temperature for about 1 to 3 hours or at temperatures above 100 C under pressure in the presence of the above-described resin soaps or other soluble resins.

After completion of the metallization, the azo pigments are recovered from the water-based reaction slurry by filtering to form a presscake of pigment which is washed with water so as to remove the excess acids, bases and salts formed in the coupling reaction. The presscake is typically washed with from about 10 to 20 times its volume of water. The filter cake is generally washed until the filtrate gives only a slightly positive test for chloride ion. The washed presscakes can be dried, ground and used in the form of a coarse or finely divided powder. Alternatively, the azo pigments of this invention can be dispersed into oleoresinous vehicles to prepare flushed bases or dispersed into aqueous vehicles to prepare aqueous dispersions where the pH is maintained below 6.5.

The pigment compositions of this invention provide improved color strength, resistance to polar solvent, light fastness and/or heat stability and are useful as coloring agents in plastics, paints and inks.

This invention, therefore, also relates to paint, ink and plastic compositions comprising major amounts of a paint vehicle, ink vehicle or plastic and minor amounts of the compositions of this invention.

The paint, ink and plastic compositions in which the compositions of this invention are useful are well known to those of ordinary skill in the art. Examples include printing inks, lacquers, thermoplastic and thermosetting materials, natural resins and synthetic resins, polystyrene and its mixed polymers, polyolefins, in particular polyethylene and polypropylene, polyacrylic compounds, polyvinyl compounds, for example polyvinyl chloride and polyvinyl acetate, polyesters and rubber, and also filaments made of viscose and cellulose ethers, cellulose esters, polyamides, polyurethanes, polyesters, for example polyglycol terephthalates, and polyacrylonitrile. It is also useful for pigment printing and for the pigmenting of paper in the mass.

Due to its excellent heat resistance, the pigment is particularly suitable for the pigmenting of plastics in the mass, such as, for example, of polystyrene and its mixed polymers, polyolefins, in particular polyethylene and polypropylene and the corresponding mixed polymers, polyvinyl chloride and polyesters in particular polyethylene glycol terephthalate and polybutylene terephthalate and the corresponding mixed condensation products based on polyesters.

See, for example, with regard to ink: R. H. Leach, editor, *The Printing Ink Manual*, Fourth Edition, Van Nostrand Reinhold (International) Co. Ltd., London (1988), particularly pages 282–591; with regard to paints: C. H. Hare, *Protective Coatings*, Technology Publishing Co., Pittsburgh (1994), particularly pages 63–288; and with regard to plastics: T. G. Webber, *Coloring of Plastics*, John Wiley & Sons, New York (1979), particularly pages 79–204. The foregoing references are hereby incorporated by reference herein for their teachings of ink, paint and plastic compositions, formulations and vehicles in which the compositions of this invention may be used including amounts of colorants. For example, the pigment may be used at a level of 10 to 15% in an offset lithographic ink, with the remainder being a vehicle containing gelled and ungelled hydrocarbon resins, alkyd resins, wax compounds and aliphatic solvent. The pigment may also be used, for example, at a level of 1 to 10% in an interior paint formulation along with other pigments which could include titanium dioxide, acrylic lactices, coalescing agents, water or solvents. The pigment may also be used, for example, at a level of 20 to 30% in a plastic color concentrate in polyethylene.

The following examples illustrate the compositions of the present invention and their methods of preparation. Unless otherwise indicated in the following examples and elsewhere in the specification and claims, all parts and percentages are by weight, temperatures are in degrees centigrade and pressures are at or near atmospheric.

EXAMPLE 1

A diazo slurry is prepared by dissolving 8 parts of 4-amino benzoic acid in 200 parts of water and 25 parts of 20 Baume hydrochloric acid. The solution is cooled to 0° C. by the addition of ice and diazotized by the addition of 4 parts of sodium nitrite in 12 parts of water and stirring the solution at 0–10° C. for 30 minutes. Excess nitrous acid is then quenched by the addition of sulfamic acid.

A coupler slurry is prepared by dissolving 17 parts of potassium salt of 2-hydroxy-naphthalene-6-sulfonic acid (Schaeffer's Salt) by heating in 250 parts of water and 2.5 parts of 50% sodium hydroxide and cooled to 0° C. with ice.

The diazo slurry is coupled into the coupler slurry over a period of 10–15 minutes. A 10 percent solution of sodium hydroxide is then added until the pH of the slurry is raised to 10. Temperature of the slurry is maintained at below 5° C. with the addition of ice. The mixture is then stirred for approximately twenty minutes to complete the coupling, followed by addition of 30 parts of 30% a solution of strontium nitrate and stirred for 30 minutes. The pH of the slurry is then lowered to 4.2 by the addition of 2.5 parts of acetic acid followed by addition of dilute hydrochloric acid. The slurry is then heated to boil. After boiling for one hour, the slurry is iced to lower than 50° C. and filtered; the filtercake is washed with water, dried overnight at 70° C. and pulverized to give an orange pigment powder.

Comparative Example 1

The procedure of Example 1 is repeated, except that after addition of strontium nitrate, the pH of the slurry is adjusted to 6.45 with acetic acid, instead of 4.2 in Example 1.

EXAMPLE 2

The procedure of Example 1 is repeated, except that 8.8 parts of 4-amino-3-methylbenzoic acid are used in place of the 4-aminobenzoic acid, to give a reddish orange pigment.

Comparative Example 2

The procedure of Example 2 is repeated, except that after addition of strontium nitrate, the pH of the slurry is adjusted to 6.5 instead of 4.2 in Example 2.

EXAMPLE 3

The procedure of Example 1 is repeated, except that 4 parts of 4-aminobenzoic acid and 4 parts of 3-aminobenzoic acid are used in place of 8 parts of 4 aminobenzoic acid.

EXAMPLE 4

The procedure of Example 1 is repeated, except that 30 parts of 30% calcium chloride solution are used in place of the strontium nitrate solution.

EXAMPLE 5

The procedure of Example 1 is repeated, except that 50 parts of a 15% solution of magnesium chloride are used in place of the strontium nitrate solution.

TEST METHOD

A mixture of 0.5 part pigment, 0.5 part titanium dioxide (DuPont Ti-Pure® R -960) and 500 parts high density polyethylene (Solvay FORTIFLEX® T50-2000-G) is shaken on a paint shaker to uniformity, then injection molded at 232 C in a 30 ton Battenfield machine. Spectrophotometric values are measured with a Macbeth Color-Eye (specular component included, large area) to give the apparent strength and hue angle under Illuminant D, 10 , shown in the Table.

TABLE I

Results from Test Method

| Pigment | Apparent Strength (K/S) | Hue Angle | % Sr |
|---|---|---|---|
| Ex. 1 | 42.74 | 44.28 | 10.4 |
| Comp. Ex. 1 | 30.28 | 37.86 | 17.3 |
| Ex. 2 | 33.45 | 37.28 | 8.73 |
| Comp. Ex. 2 | 6.90 | 18.67 | 14.6 |

As can be seen from the foregoing table, the pigments of this invention show significant improvement in color strength and a substantial increase in hue angle.

What is claimed is:

1. A composition comprising one or more compounds characterized by the formula:

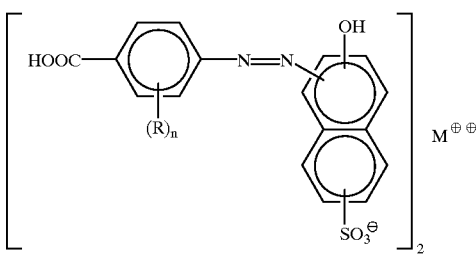

wherein each R is independently a hydrocarbyl, hydroxy, hydrocarbyloxy, carboxylic acid, carboxylic acid ester, carboxylic acid amide, sulfonic acid, sulfonic acid amide, or imidazolone group; n is 0, 1 or 2; and M is at least one divalent metal.

2. A composition according to claim 1 wherein each R is independently a lower alkyl or lower alkyloxy group.

3. A composition according to claim 1 wherein n=0.

4. A composition according to claim 2 wherein each R is independently a methyl, ethyl, methoxy or ethoxy group.

5. A composition according to claim 1 wherein the naphthalene moiety is represented by the formula:

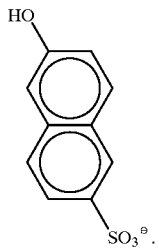

6. A composition according to claim 1 wherein the divalent metal is selected from the group consisting of alkaline earth metals, manganese, nickel, and zinc.

7. A composition according to claim 1 wherein M is Ca, Sr, Zn or Mg.

8. A composition represented by the formula:

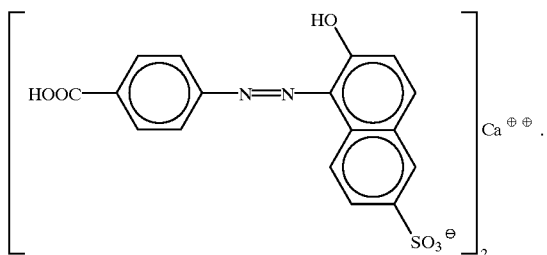

9. A composition represented by the formula:

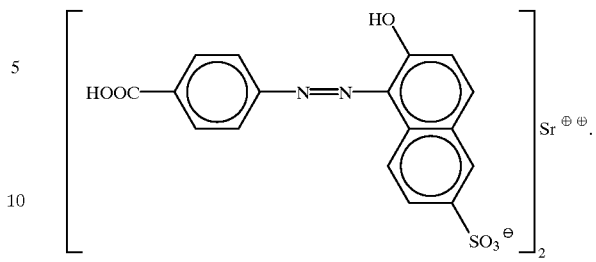

10. A process for preparing an azo pigment which comprises
1) preparing an azo dye composition by a process comprising coupling (i) at least one diazonium component of one or more aromatic amines characterized by the formula:

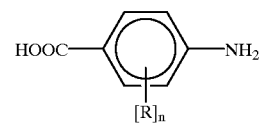

wherein each R is independently a hydrocarbyl, hydroxy, hydrocarbyloxy, carboxylic acid, carboxylic acid ester, carboxylic acid amide, sulfonic acid, sulfonic acid amide, or imidazolone group; n is 0, 1 or 2; with (ii) at least one hydroxynaphtholenesulfonic acid coupling component;
2) metallizing at least a portion of said azo dye with one or more divalent metal salts to form a slurry of azo pigment; wherein the final pH of said slurry is less than about 6; and
3) recovering at least a portion of said pigment.

11. A process according to claim 10 wherein each R is independently a lower alkyl or lower alkyloxy group.

12. A process according to claim 10 wherein n=0.

13. A process according to claim 11 wherein each R is independently a methyl, ethyl, methoxy or ethoxy group.

14. A process according to claim 10 wherein the coupling component is 2-hydroxy-naphthalene-6-sulfonic acid.

15. A process according to claim 10 wherein the divalent metal salts are selected from the group consisting of salts of alkaline earth metals, zinc, manganese, nickel and mixtures thereof.

16. A process according to claim 10 wherein said divalent metal salt is selected from the gruop consisting of Ca, Sr, Zn and Mg salts.

17. A process according to claim 10 wherein the final pH of said slurry is less than about 5.5.

18. A process for preparing an azo pigment which comprises 1) preparing an azo dye composition by a process comprising coupling (i) the diazonium component of 4-aminobenzoic acid with; (ii) 2-hydroxy-naphthalene-6-sulfonic acid;
2) metallizing at least a portion of said azo dye with one or more divalent metal salts selected from the group consisting of Ca, Sr, Zn and Mg salts to form a slurry of azo pigment; wherein the final pH of said slurry to less than about 5.5; and
3) recovering at least a portion of said pigment.

19. A composition prepared according to the process of claim 10.

20. A composition prepared according to the process of claim 18.

21. A paint composition comprising a paint vehicle and the composition of claim 1.

22. A paint composition comprising a paint vehicle and the composition of claim 8.

23. A paint composition comprising a paint vehicle and the composition of claim 9.

24. A paint composition comprising a paint vehicle and the composition of claim 19.

25. A paint composition comprising a paint vehicle and the composition of claim 20.

26. An ink composition comprising an ink vehicle and the composition of claim 1.

27. An ink composition comprising an ink vehicle and the composition of claim 8.

28. An ink composition comprising an ink vehicle and the composition of claim 9.

29. An ink composition comprising an ink vehicle and the composition of claim 19.

30. An ink composition comprising an ink vehicle and the composition of claim 20.

31. A plastic composition comprising a plastic material and the composition of claim 1.

32. A plastic composition comprising a plastic material and the composition of claim 8.

33. A plastic composition comprising a plastic material and the composition of claim 9.

34. A plastic composition comprising a plastic material and the composition of claim 19.

35. A plastic composition comprising a plastic material and the composition of claim 20.

* * * * *